Figure 1:
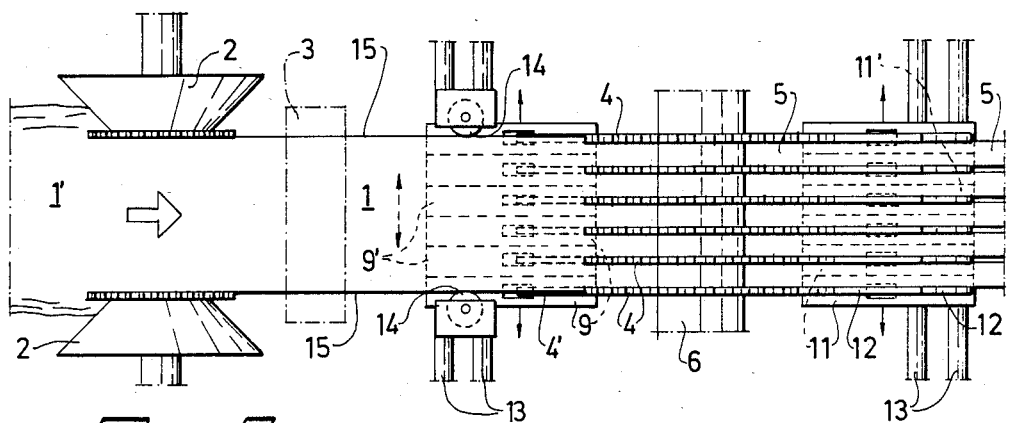

United States Patent [19]

Dutina

[11] Patent Number: 4,599,929
[45] Date of Patent: Jul. 15, 1986

[54] METHOD OF GUIDING SAW BLADES AND DEVICE FOR CARRYING OUT THE METHOD

[75] Inventor: Hans Dutina, Saltsjö-boo, Sweden

[73] Assignee: Hans Dutina AB, Sweden

[21] Appl. No.: 612,253

[22] Filed: May 21, 1984

[30] Foreign Application Priority Data

May 27, 1983 [SE] Sweden ................. 8302997
Aug. 19, 1983 [SE] Sweden ................. 8304524

[51] Int. Cl.⁴ .............................................. B27B 7/04
[52] U.S. Cl. ............................... 83/821; 83/820; 83/102.1; 83/425.4; 83/446; 144/39; 144/41; 144/357
[58] Field of Search ............... 83/821, 820, 102.1, 83/446, 425.3, 425.4; 144/39, 41, 357, 2

[56] References Cited

U.S. PATENT DOCUMENTS

| | | | |
|---|---|---|---|
| 259,661 | 6/1882 | Bowker | 83/820 |
| 1,263,443 | 4/1918 | Lien | 83/446 |
| 3,489,189 | 1/1970 | Thrasher | 83/821 |
| 3,566,934 | 3/1971 | Thrasher | 83/102.1 |
| 3,645,304 | 2/1972 | Thrasher | 83/821 |
| 4,144,782 | 3/1979 | Lindstrom | 83/102.1 |
| 4,373,563 | 2/1983 | Kenyon | 144/357 |
| 4,416,312 | 11/1983 | Ostberg | 144/39 |
| 4,440,203 | 4/1984 | Ostberg | 144/39 |
| 4,449,557 | 5/1984 | Makela et al. | 144/357 |
| 4,485,861 | 12/1984 | Nilsson et al. | 144/357 |

*Primary Examiner*—Donald R. Schran
*Attorney, Agent, or Firm*—Nies, Webner, Kurz & Bergert

[57] ABSTRACT

A method and a device for carrying out the method of guiding the blades (4) of a circular saw in operation, such as at the sawing of, for example, saw timber, timber blocks, battens or other workpieces on wood basis, where one or several blades (4) are located at an axle (6) and each blade is guided by at least one guide (9,11) acting on the blade. At least one of the guides (9,11) of each blade (4), and in such a case guides corresponding to each other for all blades (4), separate or together with said corresponding guide of remaining blades in the form of a guide package (9',11') during the sawing are floating substantially in the axial direction of the blades (4) and hereby continuously positioned laterally in response to movements and position of the workpiece (1) being sawn, substantially in the axial direction of the blades in connection to the guide or guide package and/or the lateral movements and lateral position of the blade(s) in connection to the guide (9,11) or guide package (9',11').

23 Claims, 10 Drawing Figures

METHOD OF GUIDING SAW BLADES AND DEVICE FOR CARRYING OUT THE METHOD

This invention relates to a method of guiding the blades of a circular saw in operation, where one or several blades are provided and each blade is guided by one or several guides.

The invention also relates to a device for carrying out the method.

At the sawing of workpieces, for example saw timber/timber blocks, undesired force and movement phenomena of various kinds arise, which cause sawing problems and contribute primarily to a reduced sawing yield or decrease in productivity. The problems are described below substantially with reference to a process of manufacturing saw timber, which process comprises the steps of reducing and edging resulting in a workpiece with two parallel plane sides, a so-called timber block, and subsequent reducing, at which a workpiece with substantially rectangular cross-section is obtained, and subsequent resawing with a circular saw, at which the workpiece is divided in its longitudinal direction by cuts substantially perpendicular to the sides resulting from the edging. The problems involved, however, apply more or less to substantially all sawing of workpieces of wood by means of a circular saw.

Processing forces, thus, arise, for example, at the reducing of an edged workpiece and cause undesired lateral movements and vibrations of the workpiece. When the reducing, for example, is carried out simultaneously with resawing, the lateral forces are transferred to the blade(s) fixed axially during the sawing and result in the effect of a dynamic force whereby the blade stability and thereby the dimension accuracy at the sawing deteriorate.

The force phenomenon and the deteriorated blade stability normally also give rise to undesired friction phenomena between workpiece, saw blade and saw blade guides.

At resawing, furthermore, where the workpiece is advanced in its longitudinal direction by means of horizontal feed rolls or the like, undesired local elastic and plastic deformations of the workpiece are brought about, which give rise to a certain feed in lateral direction. This phenomenon, too, causes lateral forces on and lateral movements of the blade(s), which have a negative effect on the blade stability and dimension accuracy. The same kind of negative effects are obtained at the feed by feed rolls when the plane sides obtained at the edging are not in parallel.

All saw timber, furthermore, is substantially more or less out of straight. At edging, which produces the two plane parallel sides, the main crookedness of the workpiece is caused to be in a plane in parallel with said sides. During the resawing or corresponding operation, the workpiece, irrespective of the longitudinal profile, is fed at straight sawing perpendicularly to the axle of the blades by means of feed rolls or the like, and the sawing is carried out along a substantially straight central line. At straight sawing in this way, of course, considerable loss is caused, which reduces the sawing yield substantially. A thin circular saw blade fixed in its axial direction during the sawing by guides, thus, of course does not follow the longitudinal profile of the workpiece at straight feed-in and can neither with acceptable blade stability be caused to follow normally occurring crooked longitudinal profiles even when at the feed a certain successive adjustment in respect of the longitudinal profile is made. The difficulty of maintaining an acceptable blade stability partially is due to the fact, that the aforesaid stability problems are added to those resulting from the crooked longitudinal profile.

The stability problem last referred to, as well as the aforedescribed ones, are due to the fact that thin circular saw blades have deficient stability properties compared to frame saw and band saw blades.

It is, therefore, particularly desirable to eliminate the said effect of undesired lateral movements of the workpiece and thereby to render possible at circular saws to saw accurately straight as well as curve sawing or pith sawing, even when the workpiece during the sawing operation vibrates, is displaced laterally or warped. Curve sawing offers essential advantages in the form of higher volume yield and higher quality, because the longitudinal direction of the sawn board or the like coincides with the longitudinal direction of the wood fibres.

The present invention relates to a method and a device for guiding the saw blade(s) of a circular saw which constitute a solution of the aforesaid blade stability problems. Accuracy in dimension at straight sawing and curve sawing is hereby made possible, because the effect of undesired dynamic lateral movements and vibrations of the workpiece have been substantially eliminated. It is further possible to attach more guides to each blade in order to improve the stability properties of the blade at straight and curve sawing. This affects bending waves in the saw blade body without risk of undesired friction phenomena between guides and blade. The invention also eliminates to a substantial extent the necessity of accurate pre-setting of guides and blades, because the freely movable guides are self-adjusting.

A preferred embodiment increases additionally the possibilities of solving the blade stability problems at circular saws. The adaption between guides, blades and movements and position of the workpiece is improved still more, whereby the effect of undesired dynamic force phenomena between workpiece and blade and, respectively, between blade and guide(s) is reduced still more. The blade stability increases and the centering accuracy of the set of saw blades over the workpiece is improved especially at curve and pith sawing.

The invention, thus, relates to a method of guiding the blade(s) of a circular saw in operation, for example at the sawing of e.g. saw timber, timber blocks, battens or other workpiece on wood basis, where one or several blades are provided on an axle and each blade is guided by at least one guide acting to the blade.

The method is especially characterized in that at least one of the guides of each blade, and at such guides corresponding to each other for all blades, separately or together with said corresponding guide of other blades in the form of a guide package during the sawing are floating substantially in the axial direction of the blades and hereby continuously are positioned laterally in response to the movements and position of the workpiece being sawn, substantially in the axial direction of the blades in connection to the guide or guide package, and/or to the lateral movements and lateral position of the blade(s) in connection to the guide or guide package.

The invention also relates to a device for guiding the blades of a circular saw in operation, for example at the sawing of e.g. saw timber, timber blocks, battens or other workpiece on wood basis, where one or several blades are located on an axle and each blade is guided by at least one guide acting on the blade.

The device is especially characterized in that at least one of the guides of each blade, and at such guides corresponding to each other for all blades, separately or substantially rigidly connected to said corresponding guides to a guide package are floating substantially in the axial direction of the blades and continuously positioned laterally in response to the movements and position of the workpiece being sawn substantially in the axial direction of the blades in connection to the guide or guide package and/or the lateral movements and lateral position of the blade(s) in connection to the guide or guide package.

Figure 2:
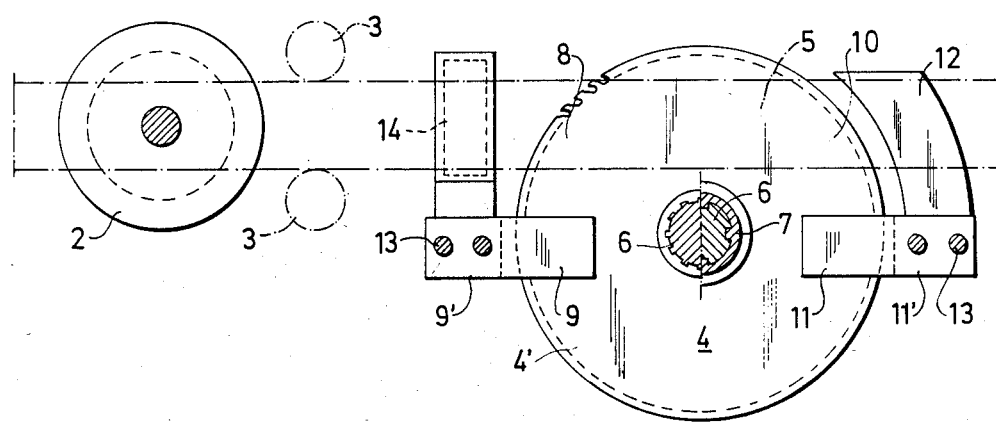
Figure 3:
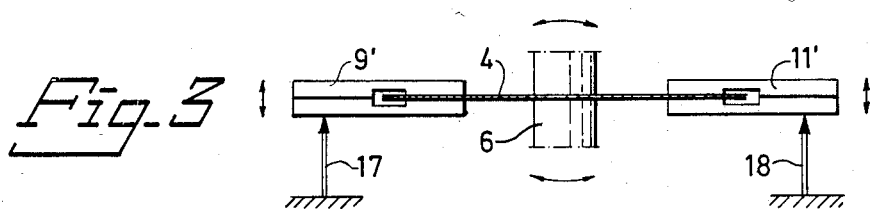
Figure 4:
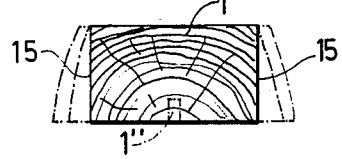
Figure 5:
Figure 6:
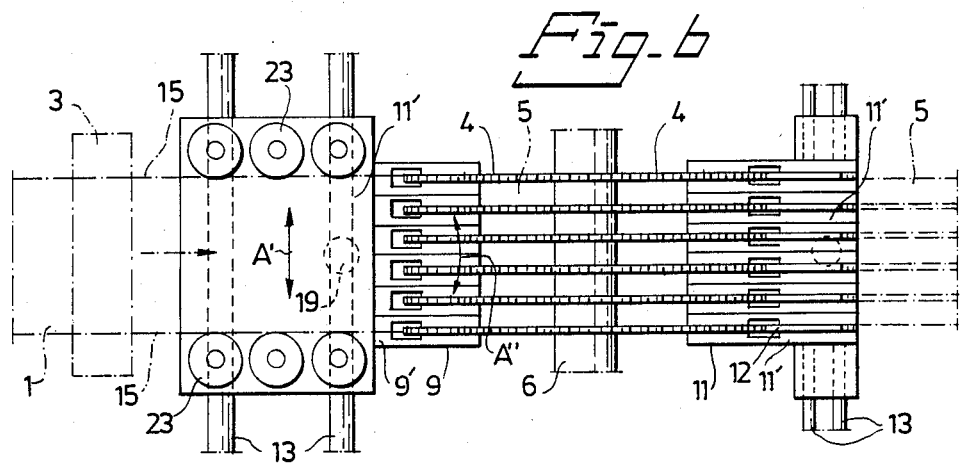
Figure 7:
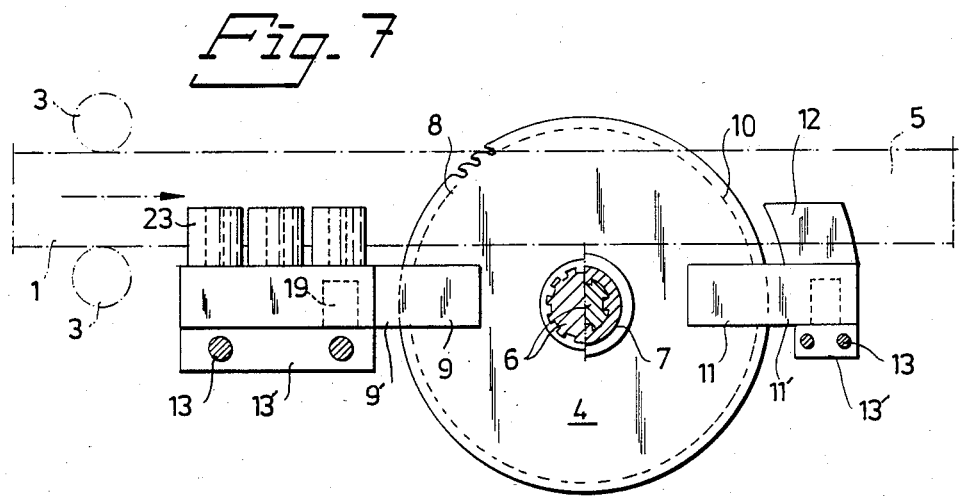
Figure 8:
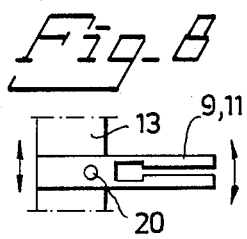
Figure 9:
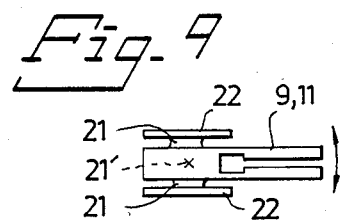

The invention is described in greater detail in the following, with reference to some embodiments and to the accompanying drawings, in which FIG. 1 schematically shows a first embodiment of a device according to the invention seen from above, FIG. 2 shows the device according to FIG. 1 seen from below in FIG. 1, FIG. 3 very schematically shows a second embodiment of a device according to the invention for guiding the feed-in of a timber block, FIG. 4 is an imaginable cross-section of a wood piece reduced to a timber block, FIG. 5 schematically shows the feed of a crooked workpiece, FIG. 6 schematically shows a third embodiment of a device according to the invention seen from above, FIG. 7 shows the device according to FIG. 6 seen from below in FIG. 6, FIG. 8 schematically shows an individually rotatable guide according to the invention, FIG. 9 schematically shows a guide according to the invention individually rotatable via rubber springs, and FIG. 10 very schematically shows a fourth embodiment of a device according to the invention for sensing the position and obliqueness of the blades, for example for guiding the feed-in of a workpiece or for guiding the adjustment of the drive axle.

In FIG. 1 an edged workpiece is designated by 1'. The numeral 2 designates opposed chipper discs for reducing the workpiece 1' to a workpiece 1 in the form of a so-called square-sawn timber block 1. Imaginable cross-sections are shown in FIG. 4, where the portions removed at the reducing operation are indicated dashed. The timber block 1 is intended by means of feed rolls 3, marked in FIGS. 1 and 2, to be fed to and through a circular saw comprising one or several blades 4 and thereby to be divided into timber block portions 5. In FIG. 1 six blades are shown. The blades are attached with a stationary hub, as shown to the right in FIG. 2, or with a floating hub, as shown to the left in FIG. 2, on an axle 6. In the case of floating hub, the blades 4 are connected to the axle 6, saw spindle 6, by means of splines or the like. In the case of stationary hub, according to the invention the blades 4 are arranged in a package on a sleeve 7 or the like, which is movable at the axle or axially fixed on the spindle 6.

Each blade 4 is guided during the sawing operation by at least one guide 9,11 acting on both sides of the blade, for example at the peripheral portion 4' thereof, as shown in FIGS. 1 and 2, where the guides are of a suitable known kind. According to the embodiment shown, for each blade are provided a front guide 9 located in connection to the feed-in area 8 for the timber block 1, and a rear guide 11 located in connection to the rear portion 10 of the blade, at which portion the timber block portions 5 formed at the sawing are intended to leave the blades. At the rear guides 11 preferably guide plates 12, guide knives 12, or corresponding means are provided directly in front of the respective blade and intended among other things to keep the portions 5 apart.

According to the invention at least one of the guides 9, 11 of each blade, in this case both the front one 9 and the rear one 11, together with corresponding guide 9,11 of, in applicable cases, remaining blades, are substantially rigidly connected to a guide package 9',11', and mounted floating substantially in the axial direction of the blades 4, and continuously are positioned laterally in response to the movements and position of the workpiece 1 being sawn substantially in the axial direction of the blades in connection to the guide package and/or the lateral movements and lateral position of the blades in connection to the guide package. It is imaginable, at least at the rear guides 11, that these are separate, i.e. not connected to a package 11', in which case said lateral positioning takes place idividually for each guide 11, in response to said movements and position in connection to the guide. Each floating guide 9,11 or guide package 9',11' is movable on guide ways 13 or the like, for example as shown in FIGS. 1 and 2.

According to the invention, means for sensing said movements and for said displacing are provided. At the embodiment shown in FIGS. 1 and 2 said means for the front guides 9 consist of guide rolls 14, which are connected to the front guide package 9' and during the sawing abut the side surfaces 15 of the timber block 1, which are substantially in parallel with the blades 4, whereby the axial position of the guide package, and thereby of the blades 4, is guided directly by the timber block 1, so that the saw blade stability and the centering can be maintained independently of the lateral movements and lateral position of the workpiece 1. Preferably at least one roll 14 is adjustable to and from the other roll.

The rolls, of course, can be replaced by guide ways or the like in a manner obvious for bringing about the mechanical coupling between timber block and guide package. It also can be imagined that a longitudinal, straight or curved groove 1", marked in FIG. 4, is milled in the lower surface of the block prior to the feed-in, and a longitudinal guide knife (not shown) is located at the guide package 9', which in this way is coupled mechanically to the block 1 for sensing the movements and position thereof. It also is imaginable that the position and movements of the block are sensed from above, for example by means of bi-conic rolls, which are connected to the guide package 9'.

It can also be imagined that at least the position of the timber block continuously is sensed mechanically or without contact adjacent the guide package 9', and that adjusting means not directly connected to the timber block are provided for continuously moving the guide package 9' on the basis of the sensed position of the timber block 1.

It is, of course, imaginable to use combinations of two or more of the arrangements described, or of other arrangements, and of methods for sensing the movements and position of the workpiece.

In the embodiment shown in FIGS. 1 and 2, the rear guide package is floating and freely movable. The means for sensing the movements of the timber block portions 5 consist of the blades 4 and said guide knives 12, because these are affected mechanically by and adjusted in view of said movements, and the means for moving the guide package 11' of the blades 4 and said guide knives 12. The guide package, thus, follows the movements of the portions 5 via the blades 4 and guide knives. It is imaginable that the guide knives 12 are omitted, in which case the guide package is positioned laterally only by the blades 4. It is, of course, imaginable that guide rolls, guide ways or the like are provided also at the rear guides for sensing the movements and position of the workpiece.

In FIG. 3 the numerals 17,18 designate means, mechanical or contactless, for continuously sensing the position of the front and rear portion of the respective guide package, and therewith directly of the blades, in relation to a reference. Information is hereby obtained on the position of the packages 9', 11' relative to each other, which information is intended by suitable calculation and control means of substantially known type to be utilized for continuously guiding the feed-in of the timber block, so that the front and rear guide of each blade will be located substantially in a plane perpendicular to the saw spindle, irrespective of the longitudinal profile of the timber block, whereby good stability of the blade is obtained. In FIG. 3 only one blade is shown. It also is imaginable on the basis of said information in a suitable way to continuously adjust the saw spindle, as marked in FIG. 3, in relation to the longitudinal direction of the workpiece, whereby substantially the same result is obtained. The adjusting of the saw spindle 6 can be combined with the guiding of the feed-in. It also can be imagined that the position of the front and rear portion of the guides and blades are sensed indirectly, for example by sensing the position of the workpiece. It is imaginable that only one guide package is floating, in which case the position thereof is sensed.

In the embodiments shown in FIGS. 6-10 of a device according to the invention, said lateral positioning at least partially is intended to take place by turning the guide 9,11 or guide package 9',11', in that the guide or guide package is rotatable about an axis of rotation substantially in parallel with the plane of the blades 4.

According to the embodiment shown by way of example in FIGS. 6 and 7, said floating guides 9,11 are movable substantially in the axial direction of the blades and also rotatable as indicated by the arrows A' and, respectively, A" in FIG. 6. The guides, as shown in FIGS. 6 and 7, can be movable simultaneously along guide ways 13 or the like as one unit by means of a supporting plate 13' or the like and at the same time be rotatable as one package 9',11' which is rotatable about a common axle 19 or the like constituting said axle of rotation. It also is possible to imagine embodiments where the guides 9,11 are movable simultaneously, as in FIGS. 6 and 7, but where each guide 9,11 is rotatable individually about an axle 20, as indicated schematically in FIG. 8, where only one guide 9, 11 is shown. Embodiments can also be imagined where the floating guides are only rotatable, either as a package 9',11' according to FIGS. 6 and 7 or individually as in FIG. 8.

The guides 9,11 or a guide package 9',11', of course, can be rotatable in a way other than by axles 19,20, for example by means of elastic connections, for example rubber connections 21, located at the sides of a guide and at supporting members 22, as schematically shown in FIG. 9, whereby an axis of rotation 21' is obtained between the elastic means.

In order to improve the dynamic properties of the guides, resilience, inertia and damping can be coupled to the rotation, for example via external means.

Substantially as in the embodiment according to FIGS. 1 and 2, means are provided for sensing said movements and for said rotation and/or displacement. In the embodiment according to FIGS. 6 and 7 these means for the front guide package 9' consist of guide rolls 23 connected to the guide package and during the sawing abutting the side surfaces 15 of the timber block 1 which are substantially in parallel with the blades 4, whereby the axial position of the guide package and thereby of the blades is guided directly by the workpiece 1, timber block 1, so that sawing stability and centering can be maintained irrespective of lateral movements and lateral position of the workpiece 1. The rolls 23 preferably are connected to the rotatable guide package 9'. In order by turning the package 9' to facilitate the adaption, for example, to changes in direction, crookedness, of the block 1, said sensing means can be extended in the longitudinal direction of the block 1, for example in such a way that several rolls 23 are provided on each side of the block 1, as shown in FIGS. 6 and 7. It is, of course, possible to imagine embodiments where only one roll 23 is located on each side of the block.

As at the embodiment shown in FIGS. 1 and 2, the rolls, of course, can be replaced by guide ways or the like in an obvious manner. It is also imaginable that guidance is brought about by a longitudinal groove 1" according to FIG. 4 in the block. In this case it also can be imagined (not shown) that sensing is effected from above by means of, for example, biconic rolls connected to the guide package.

Embodiments substantially according to FIGS. 6 and 7 (not shown) also can be imagined where at least the position of the timber block 1 continuously is sensed mechanically or contactless adjacent the guide package 9', and that adjusting means not directly connected to the timber block are provided for continuous lateral positioning, turning and, when applicable, displacement of the guide package 9' on the basis of the sensed block position.

It is, of course, also imaginable to use combinations of two or more of the aforesaid or other means and methods for sensing movements and position of the workpiece.

Figure 10:
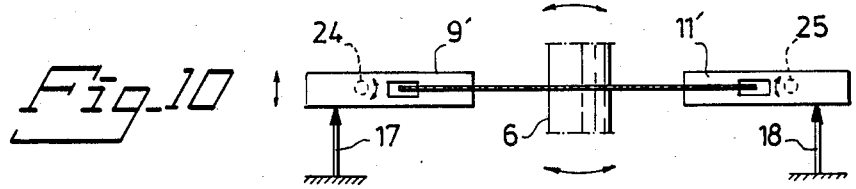

In FIG. 10, which substantially corresponds to FIG. 3, the numerals 17,18 designate means, mechanical or contactless ones, for continuously sensing the position of the front and rear portions, and thereby directly of the blades, in relation to a reference. The numerals 24,25 designate means, only indicated, such as angle transmitters of known type, for sensing the obliquity of the guides in relation to a reference position. Information is hereby obtained on the position and direction of the packages relative to each other, and on the inclination of the blades relative to the spindle 6. What was said with reference to FIG. 3, applies in remaining respects also here.

It is possible to imagine within the scope of the invention also a method and a device where guide(s) and/or saw spindle are adjustable and adjusted by displacement/turning in view of the average inclination over the sawing line of the entire workpiece or of critical portions thereof. The guide(s) and/or saw spindle are hereby given a fixed or substantially fixed inclination, which is adapted to the average position and movements of the entire workpiece or portions thereof, whereby undesired force phenomena or guides and blades are reduced and whereby the workpiece can be sawn with regard paid to crookedness of the longitudinal profile or obliquity over the sawing line caused by the feed-in.

The method and mode of operation of the device according to the invention substantially should have become apparent from the aforesaid.

By a first sawing operation, not shown and discussed here, and subsequent reduction, a timber block with substantially planeparallel sides is obtained. The timber block is fed in a substantially rectilinear path to the saw by means of feed rolls. During the sawing the timber block or the like moves in the axial direction of the blades relative to an arbitrary fixed point in connection to the feed-in area. These movements are a.o. random, relatively rapid displacements, for example owing to the reduction or deficiencies of the feed equipment, and more continuous displacements owing a.o. to deviations from an entirely straight longitudinal profile. These latter displacements are illustrated in FIG. 5. The position of the side surface 15 which will be sensed at the arrow, at the passing feed of the block first will be displaced upward and thereafter downward in the Figure.

By adjustment, movement and/or turning of the front guide package in response to the position of the block in connection to the package, in front thereof, automatic centering is obtained. Due to the fact that the rear guide package is freely movable and/or rotatable and thereby adapts to the movements of the blades and portions 5, sawing proceeds with adaption to the longitudinal profile of the timber block or the like, i.e. the timber block will be curve sawn, and at the same time said lateral movements can be taken up without great lateral forces arising on the blades. As the blades as well as the guide package(s) are floating and movable/rotatable, the position of the blades, the position of the guides and the position of the workpiece are adjusted to each other.

At the embodiments according to FIGS. 1,2,6 and 7, in applicable cases, movable rolls are tightened up when the first end of the timber block passes the rolls.

At the embodiments according to FIGS. 3 and 10 the unsawn portion of the timber block, i.e. the portion located before the saw, is intended to be moved substantially transversely to its longitudinal direction, so that the guides are located in a plane substantially perpendicular to the saw spindle irrespective of the longitudinal profile of the timber block. It is imaginable to sense, for example, the position of a guide package and the position of a side surface of the unsawn block.

It can be imagined, of course, also to apply the method and device, for example, to two-sawn workpieces, i.e. with cross-sections, for example, according to the dashed outer contour in FIG. 4 and, thus, not square sawn. It also is imaginable to apply the method and device to saw timber, battens or other workpieces on wood basis.

As should have become apparent, the method and device according to the invention provide the possibility of circular sawing where the influence of undesired lateral movements etc. of the workpiece during the sawing operation has been eliminated. This is rendered possible in these connections by very simple and inexpensive means. As the position of the timber block adjacent the guide package(s) is utilized for adjusting the position of the blades to the workpiece, imperfectnesses of the positioning, for example a certain obliqueness of the positioning of the workpiece when being placed in the saw substantially are eliminated. At the simpler variations and embodiments, by means of floating guides or guide packages the dynamic rigidness and stability, for example at straight sawing, are improved.

The described rotatability of the guides which often is to be preferred renders it possible to incline the blades, substantially without giving rise to undesired force phenomena between guides and blade. The rotatability offers advantages over the advantages of floating movable guides. The rotatability of the guides, for example, implies good adaptation between guides and blades. Furthermore, when the distance between the axis of rotation of the guides and the circumference of the blades adjacent the guides is small, a moderate rotation, inclination, does not cause an undesired displacement of the sawing area in the axial direction of the blades, which is desired at certain applications. The good adaptation between guides and blades also implies that, in relation to the blades, radially large guides can be used without causing undesired friction phenomena, and that the saw spindle can be inclined without giving rise to centering problems or undesired force phenomena.

The invention has been described above with reference to some embodiments. Of course, more embodiments and minor alterations can be imagined without, therefore, abandoning the invention idea.

Within the scope of the invention, thus, a plurality of combinations of floating or floating and fixed guides or guide packages can be imagined. Embodiments can be imagined, for example, where only one guide package or one guide of each blade, preferably the rear one(s), are floating, whereby an improvement in dynamic rigidity is obtained, and whereby the front guides, separate or as a package, are fixed in axial direction during the sawing. The rear guides, as mentioned, can be separate or arranged in a package and may have no means for sensing said movements and position or may be provided with guide knives or guide rolls, guide ways or the like.

As should have become apparent from the aforesaid, a plurality of different means for sensing said movements and position can be imagined. Among other things bi-conic rolls, diabole rolls. have been mentioned which are suitable at feed from above of two-sawn blocks. Means can also be imagined of known type for positioning at curve sawing where pressure- or spring-loaded rolls are provided which follow the longitudinal profile of the workpiece and which, by said load which is well balanced, are capable to compensate for irregularities etc. in the surfaces, on which guidance is effected, while at the same time following the average continuous longitudinal profile of the workpiece.

The means for sensing movements and position of the workpiece, said rolls or the like, must not necessarily be placed on the rotatable guide package 9', as shown in FIG. 6, but embodiments can be imagined where the means are located at the supporting plate 13 or the like. Combinations of said locations also can be imagined.

The said means for milling the groove 1", which is straight or intended to follow the longitudinal profile of the workpiece, are of a suitable known type.

It is, of course, not necessary to arrange guides as front or rear guides, but guides can be placed in other positions in the circumferential direction of a blade.

It can be imagined to connect external means to floating guides according to the invention in order to dampen vibrations and oscillations, by which means resilience, damping and mass inertia can be supplied.

What has been stated in general about the method and device according to the invention is, of course, obviously applicable irrespective of whether the floating guides are only movable or both movable and rotatable.

The invention, thus, must not be regarded restricted to the embodiments described above, but can be varied within the scope of the attached claims.

I claim:

1. A method of guiding the blades of a circular saw in operation, for example for the sawing of saw timber, timber blocks, battens or other workpieces of wood or wood products, where at least one blade is provided and located on an axle and guided by at least one saw guide acting on the blade from the two opposing sides of the blade, in the case of more than one blade, characterized in that: for each blade (4) providing a movable saw guide (9,11), which saw guide (9,11) during the sawing is permitted to be movable substantially in the axial direction of the blade (4) for displacement substantially in the axial direction of the blade; continuously laterally positioning the saw guide in response to the axial movements and axial position of at least one of the elements the workpiece (1) being sawn and the blade (4) in association with the saw guide (9,11).

2. A method as defined in claim 1 characterized in that said lateral positioning, at least partially, is effected by rotating each saw guide about an axis of rotation substantially in parallel with the plane of the blade (4).

3. A method as defined in claim 1, characterized in that during sawing, movable guides (9,11) are arranged in a saw guide package (9',11'), said saw guide package (9',11') being continuously laterally positioned.

4. A method as defined in claim 3, characterized in that said movable saw guides are positioned laterally partially by movement substantially in the axial direction of the blades (4) and partially by the rotation of said saw guides.

5. A method as defined in claim 1, wherein each blade is guided by a front saw guide located in association with the feed-in area, the front sawing area, for the workpiece, characterized in that: during the sawing said saw guides (9) at the front area are movable and continuously positioned laterally.

6. A method as defined in claim 1, where every blade in connection to its rear portion, at which the workpiece portions formed at the sawing leave the blades, is guided by means of a rear saw guide, characterized in that: during the sawing said rear saw guides (11), separate or together as a saw guide package (11'), are movable and continuously positioned laterally.

7. A method as defined in claim 3, characterized in that: said movable saw guide package (9', 11') is connected to mechanical guide means, such as guide ways, guide rolls (14), a guide plate or the like, which, during the sawing, are caused to abut the workpiece (1), whereby the axial position of the saw guide package (9',11'), and therewith of the blades, continuously and directly is guided by the movements and position of the workpieces.

8. A method as defined in claim 3, characterized in that: said movements and position of the workpiece (1) in connection to the saw guide package (9') continuously are sensed by sensing means, and that the saw guide package (9') continuously is positioned laterally substantially in the axial direction on the basis of said sensed movements and position by adjusting means not directly connected to the workpiece.

9. A method as defined in claim 1, characterized in that: the axial position of the portions of each blade and therewith the inclination of the blade relative to said axle (6), saw spindle (6), is sensed by sensing the lateral position of the corresponding saw guides.

10. A method as defined in claim 1, where rear saw guides are provided, characterized in that: at least certain of said rear saw guides (11) are connected to guide knives (12), where each guide knife (12) is located substantially in association with a blade (4).

11. A method as defined in claim 1, characterized in that: each saw guide and/or the saw axle (6) is adjusted in view of the average inclination over the sawing line of the entire longitudinal profile of the workpiece or of parts of said longitudinal profile.

12. A device for guiding the blades of a circular saw in operation, for example for the sawing of saw timber, timber blocks, battens or other workpieces of wood or wood products, where at least one blade is provided, is mounted on an axle and at least one saw guide acting on the blade from the two opposing sides of the blades, guides said blade, characterized in that: for each blade (4) there is provided a movable saw guide (9,11), which saw guide is mounted to be movable during the sawing, the saw guide (9,11) being movable substantially in the axial direction of the blade (4) for displacement substantially in the axial direction of the blade and being arranged to be continuously laterally positioned in response to the axial movements and axial position of at least one of the following elements, the workpiece (1) being sawn and the blade (4) in association with the guide (9,11).

13. A device as defined in claim 12, characterized in that: rotational engagement between each saw blade and the associated saw guide provides for said lateral positioning, at least partially by pivotal rotation of each saw guide, each saw guide being mounted for pivotal movement about an axis of rotation (19,20,21') substantially in parallel with the plane of the blades (4).

14. A device as defined in claim 12, characterized in that: correspondingly associated, during sawing, movable saw guides (9,11) are combined in a saw guide package (9',11), said package being arranged to be continuously laterally positioned.

15. A device as defined in claim 13, characterized in that: said movable saw guides are mounted for movement substantially in the axial direction of the blades (4) and also pivotable.

16. A device as defined in claim 14, where each blade is guided by means of a front saw guide located in the feed-in area, the sawing area, for the workpiece, characterized in that: a saw guide package (9') comprising a plurality of said front saw guides (9) is mounted to be continuously laterally positioned.

17. A device as defined in claim 12, where each blade, adjacent its rear portion, where the workpiece portions formed by the sawing leave the blades, has associated therewith and is guided by a rear saw guide, characterized in that: at least one of said rear saw guides (11), is arranged to be continuously positioned laterally.

18. A device as defined in claim 14, where said movable saw guides are arranged in a saw guide package, characterized in that: said saw guide package (9',11') is mounted for movement substantially in the axial direction of the blades (4) by means of guide ways (13) or the like, and that said saw guides (9,11) comprised in the package (9',11') are rigidly connected and pivotally rotatable about a common axle (19,21') or separate and mounted to be individually pivotably rotatable about an axle (20,21').

19. A device as defined in claim 14, characterized in that: mechanical guide means, such as guide ways, guide rolls (14), a guide knife or the like, are included and mount said movable saw guide package, enabling the saw guides, during the sawing, to abut the workpiece (1), whereby the axial position of the guide package (9',11'), and therewith the blades, is guided directly by the workpiece, so that saw blade stability and centering can be maintained irrespective of later movements or lateral position of the workpiece.

20. A device as defined in claim 16, characterized in that: means are included therein for continuous sensing of said movements and position of the workpiece (1) relative to said saw guide package (9'), and that adjusting means not directly connected to the workpiece, are provided in connection with and for continuous lateral positioning of the saw guide package (9') in response to said sensed movements and position.

21. A device as defined in claim 12, characterized in that means (17, 18, 24, 25) are provided for sensing the axial position of portions of each blade and therewith of the inclination of the blade relative to said saw blade axle (6), and means (17,18,24,25) are provided for sensing the movements of the saw guides), said sensing means controlling means enabling guidance control of said workpiece.

22. A device as defined in claim 12, where rear saw guides are provided, characterized in that: guide knives are connected to at least certain of said rear guides (11) and each guide knife (12) is located substantially in association with a blade (4).

23. A device as defined in claim 12, characterized in that: at least one of each saw guide and the saw spindle (6) are adjustable and intended to be adjusted in view of the average inclination over the sawing line of the entire longitudinal profile or portions of said longitudinal profile of the workpiece.

* * * * *